(12) United States Patent
Mueller et al.

(10) Patent No.: US 6,850,686 B2
(45) Date of Patent: Feb. 1, 2005

(54) MACHINING AN INSULATED OPTICAL FIBER

(75) Inventors: Emmerich Mueller, Aidlingen (DE); Peter Thoma, Rottenburg (DE); Tobias Ruf, Renningen (DE)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 10/472,353

(22) PCT Filed: Feb. 15, 2002

(86) PCT No.: PCT/EP02/01642

§ 371 (c)(1),
(2), (4) Date: Mar. 5, 2004

(87) PCT Pub. No.: WO02/077681

PCT Pub. Date: Oct. 3, 2002

(65) Prior Publication Data

US 2004/0131325 A1 Jul. 8, 2004

(30) Foreign Application Priority Data

Mar. 21, 2001 (DE) .......................................... 101 13 740

(51) Int. Cl.⁷ ................................................. G02B 6/00
(52) U.S. Cl. ..................................................... 385/134
(58) Field of Search ................................. 385/134–137

(56) References Cited

U.S. PATENT DOCUMENTS

| 4,046,298 | A | 9/1977 | Schroeder, Jr. | ................. | 225/2 |
| 5,188,268 | A | 2/1993 | Hakoun et al. | ............. | 225/96.5 |
| 5,469,611 | A | 11/1995 | Sasaki et al. | ............... | 29/426.2 |
| 5,999,682 | A | 12/1999 | Vincent et al. | ............. | 385/134 |
| 6,023,996 | A | 2/2000 | Dodge et al. | ................. | 81/9.51 |

FOREIGN PATENT DOCUMENTS

| DE | 4227041 A1 | 2/1994 |
| DE | 692 08 235 | 9/1996 |
| EP | 0899594 A2 | 3/1999 |
| EP | 0 899 594 | 3/1999 |
| JP | 62131209 | 6/1987 |
| JP | 62223708 | 10/1987 |
| WO | WO 98/33082 | 7/1998 |

Primary Examiner—Javaid H. Nasri (57) ABSTRACT

An apparatus for processing an insulated fiber includes an optical fiber provided with insulation a retention device, which clamps the insulated fiber placed inside it, and a holder-bracket assembly comprising two holder brackets, between which a projecting section of the insulated fiber is located in a starting position beyond the retention device and is clamped in the retention device, which can be adjusted in relation to each other and perpendicular to fiber and which hold a section of the fiber insulation to be removed in a holding position. A cutting device is provided that cuts into the insulation to be removed perpendicular to the fiber. The retention device and the holder-bracket assembly can be adjusted in relation to each other, parallel to the fiber, during which the fiber is fixed in relation to the retention device, while the cut-off insulation is fixed in relation to the holder-bracket assembly.

16 Claims, 8 Drawing Sheets

MACHINING AN INSULATED OPTICAL FIBER

This application claims the benefit of the earlier filed International Application No. PCT/EP02/01642, International Filing Date, Feb. 15, 2002, which designated the United States of America, and which international application was published under PCT Article 21(2)as WO Publication No. WO 02/077681 A2.

BACKGROUND OF THE INVENTION

This invention concerns the processing of an insulated optical fibre.

Optical fibres are usually provided with an insulation, which can comprise several layers. The optical fibre must be stripped before a connecting member, e.g. a connector can be mounted on it. Even if two fibres are to be connected together permanently or temporarily, e.g. in order to conduct optical measurements, both fibres must be stripped at the ends that are to be brought into contact with each other.

In order to improve the optical connection with regard to quality and the lowest possible transmission loss, an interface may be created at the end of the stripped fibre, which is as even as possible. In the case of optical fibres, in particular glass fibres, even interfaces can be realised by means of a cleaving method in which the fibre is cleaved substantially perpendicular to its lengthwise direction. Cleaving tools are available to this end, e.g. from the company of York Technology in the United Kingdom, into which the fibre with its stripped end section is placed. The stripped fibre is clamped in two positions, which are a particular distance apart, and cleaved using a cutting element which is perpendicular to this, in particular with a diamond blade, perpendicular to the lengthwise direction of the fibre.

The end section of the stripped and cleaved fibre can be inserted into an adapter or into any other connecting member, in order to realise an optical coupling, for example using a measurement and/or testing device. It is similarly possible to optically connect together two stripped and cleaved fibre ends. To this end, both fibre ends can, for example, be placed in a linear adjustment groove, in which both cleaved fibre ends abut each other face-on. In this position, both fibres can be clamped to the adjustment groove or to a support in the adjustment groove, in particular with a holding-down clamp. Special coupling fluids can be used in order to improve the optical coupling, e.g. in order to reduce the effects of optical refraction at the media boundaries.

An appartus for removing the insulation from an optical fibre is known from WO-A-98/33082. U.S. Pat. No. 6,023,996 shows an apparatus, which on the one hand enables the fibre to be stripped and on the other allows it to be cleaved. An apparatus is referred to in U.S. Pat. No. 5,999,682 that can be used to strip and cleave the end sections of two fibres and subsequently connect them in an adjustment groove.

EP-A-0 899 594 A2 discloses an apparatus for removing insulation and for fusion-splicing an optical fibre.

A manufacturing procedure for cutting and prior removal of the casing from cables and wires, and an apparatus for carrying out this procedure, is known from DE-T2-692 08 235.

Moreover, U.S. Pat. No. 4,046,298 describes the stripping of a protective layer from a fibre bundle containing several optical fibres. DE-A-4227041 describes the removal of the protective layer of a fibre optic cable.

SUMMARY OF THE INVENTION

The task of the present invention is to improve the manufacture of an optical connection. This task is resolved by the characteristics of the independent claims. The dependent claims describe advantageous embodiments.

According to the invention the holder-bracket assembly acquires a dual function to, namely on the one hand a holding function when the fibre is drawn out of its insulation and on the other hand a holding function when tensioning the fibre for the cleaving procedure. This construction means that the fibre, retention device and holder-bracket assembly always have the same alignment orientation when the fibre is being stripped and cleaved; it is no longer necessary to change the clamping tools. This can increase the overall precision of the cleaving procedure, making it possible to improve the quality of the attainable optical coupling. In the case of the apparatus according to the invention, the end section of the fibre is not completely stripped, unlike in conventional procedures, rather a fibre end remains in the removed section of insulation. In order to tension the stripped fibre section, it is clamped indirectly by both the retention device and the holder-bracket assembly indirectly via the insulation, thereby avoiding any damage to the fibre. In contrast to this, all the conventional procedures fist fully strip the fibre end section and then clamp the stripped fibre directly in order to carry out the cleaving procedure, which may cause damage to the fibre.

Moreover, this procedure has the advantage that at least part of the cleaved and stripped fibre end section is still located in the insulation, making it significantly easier to dispose of the fibre section, which is detrimental to health.

In one embodiment, the holder brackets of the holder-bracket assembly can be controlled so that a retention force by which the holder brackets hold the fibre insulation when tensioning the fibre for the cleaving process is greater than when the fibre is drawn out of its insulation. In this way, greater tensile forces can be exerted on the fibre to tension it than when the fibre is being drawn out of the insulation after it has been stripped.

According to the invention the stripped fibre can be cleaved during the relative adjustment between the retention device and the holder-bracket assembly in a continuous process, in which the stripping procedure is terminated seamlessly by the cleaving procedure. The two holder brackets exert a continuously firm hold on the section of the fibre insulation to be removed, from the starting position to the holding position, thus at least ensuring that an appropriate tensile stress can be retained in the fibre when extracting the fibres from its insulation to cleave it.

An embodiment is advantageous, in which the retention device has a seating for mounting an adapter, into which the insulated fibre to be processed can be placed and which clamps the insulated fibre placed within it, wherein this adapter can be connected to an optical device, e.g. a measurement and/or testing device or a positioning device. A stripped and cleaved fibre must usually be inserted or threaded into such an adapter with care, wherein the even cleaved surface at the fibre end can easily be damaged. This difficult threading procedure can be dispensed with in the proposed embodiment.

In a further development, the fibre can be positioned in or on the adapter after having been cleaved and after the adapter has been removed from the seating in such a way that without further difficult manipulations in the adapter, particularly with respect to positioning, the fibre contained in the adapter can be optically connected directly to the relevant device, e.g. a measurement and/or testing device or a positioning device.

In accordance with a different embodiment, at least two retention devices can be provided so that at least two fibres can be stripped and cleaved, wherein moreover a splicing tool is provided, which connects together two stripped and cleaved optical fibres that have been positioned together. According to the invention, the two retention devices can be adjusted in relation to each other in such a way that the splicing tool uses these retention devices to position the fibres to be optically connected together in relation to each other. These measures mean that the retention devices have a dual function, namely on the one hand holding the fibre while it is being stripped and cleaved and on the other hand holding the fibre to position it within the splicing procedure. This means that the fibre only has to be positioned in the retention device at the beginning of the process, and it is no longer necessary to make any adjustment during the remainder of the process, wherein the overall precision and quality of the connection between the two fibres created in this way increases.

BRIEF DESCRIPTION OF THE DIAGRAMS

The invention is described in the following by referring to the diagrams, wherein the same reference symbols refer to the same or functionally identical or similar features. Schematic representations are provided of the following, FIGS. 1 through 5 top views of a highly simplified representation of the apparatus according to the invention involving an initial embodiment and various operating phases, FIG. 6 a side view of the apparatus according to FIG. 5, FIGS. 7 and 8 top views of the apparatus according to the invention, but of a second embodiment and various operating phases, FIG. 9 a top view of the apparatus according to the invention, but of a third embodiment, FIGS. 10 through 12 top views of the apparatus according to the invention, but of a fourth embodiment and various operating phases, and FIGS. 13 through 15 top views of the apparatus according to the invention, but of a fifth embodiment and various operating phases.

DETAILED DESCRIPTION OF THE DIAGRAMS

In accordance with FIGS. 1 through 6 an initial embodiment of the apparatus 1 according to the invention has a retention device 2, comprising a holder 3, into which an insulated fibre can be placed. In the figures, the insulated fibre is constantly identified by the number 4, while the actual fibres are referred to as 5 and their insulation as 6. It is evident that insulation 6 can be comprised of a single layer or multiple layers. The figures only illustrate an end section of insulated fibre 4; at the other end of insulated fibre 4, which is not illustrated, this may lead to an optical module or device.

Holder 3 can have a permanent connection to retention device 2. In a different embodiment, it is possible to remove holder 3 and holder 2 that are clamped together, to which end holder 2 has a corresponding seating 7. In a special embodiment, holder 3 can be provided as an adapter, which can be connected to an optical measurement and/or testing device.

The insulated fibre 4 placed in holder 3 can be clamped in holder 3 to which end holder 3 has corresponding holding implements that are not illustrated.

Moreover, apparatus 1 has a holder-bracket assembly 8, which has two holder brackets 9. Holder brackets 9 are oriented parallel to fibre 5 and in the starting position illustrated in FIG. 1 form a gap 10 between them, into which the projecting section 13 of insulated fibre 4 extends while clamped in holder 3 via retention device 2.

Furthermore, a cutting device 11 is provided, which when operated can cut perpendicularly into the insulation 6 of fibre 5, which is to be removed. To this end, cutting device 11 can be constructed in the conventional way and have in particular two V-shaped blades, which are not illustrated, which are adjusted to cut into insulation 6 perpendicular to fibre 5, thereby gripping and cutting into insulation 6 with their cutting flanks.

Moreover, the apparatus has a cleaving unit 12, which makes it possible to cleave stripped fibre 5 substantially perpendicular to its lengthwise direction, provided that fibre 5 is tensioned in the lengthwise direction. For example, this kind of cleaving unit 12 has a cleaving blade, which is not illustrated, and which can be adjusted against fibre 5 perpendicular to the lengthwise direction of the fibre.

Apparatus 1, which is in accordance with the invention, as illustrated in FIGS. 1 through 6, operates as follows:

Insulated fibre 4, the end section of which is to be stripped and which is to be provided with cleaved end, is placed and clamped in holder 3. According to FIG. 1, insulated fibre 4 is positioned in holder 3 so that the free end section 13 of insulated fibre 4 extends by means of an axial length 14 into the gap 10 formed between holder brackets 9. Here, holder 3 is configured so that fibre section 13 and holder brackets 9 are automatically oriented in parallel.

Figure 1:
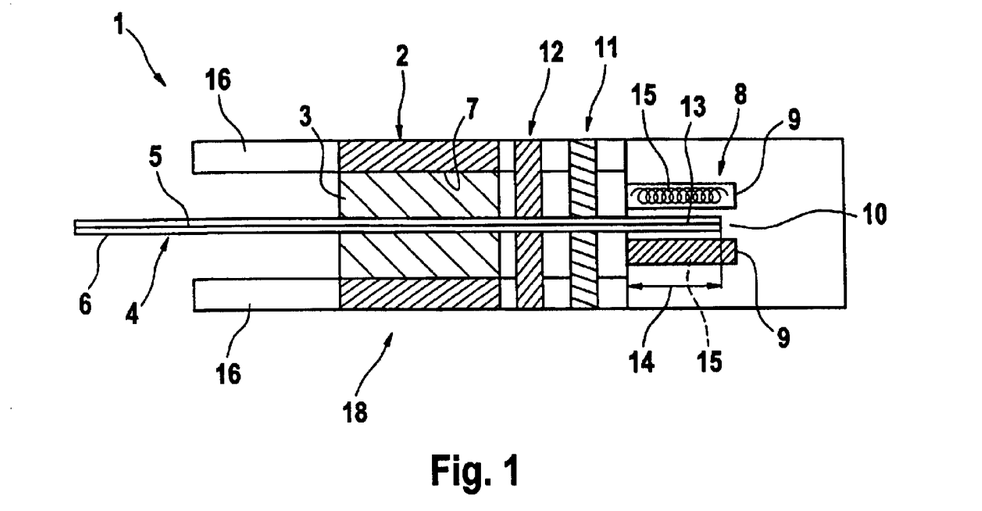
Figure 2:
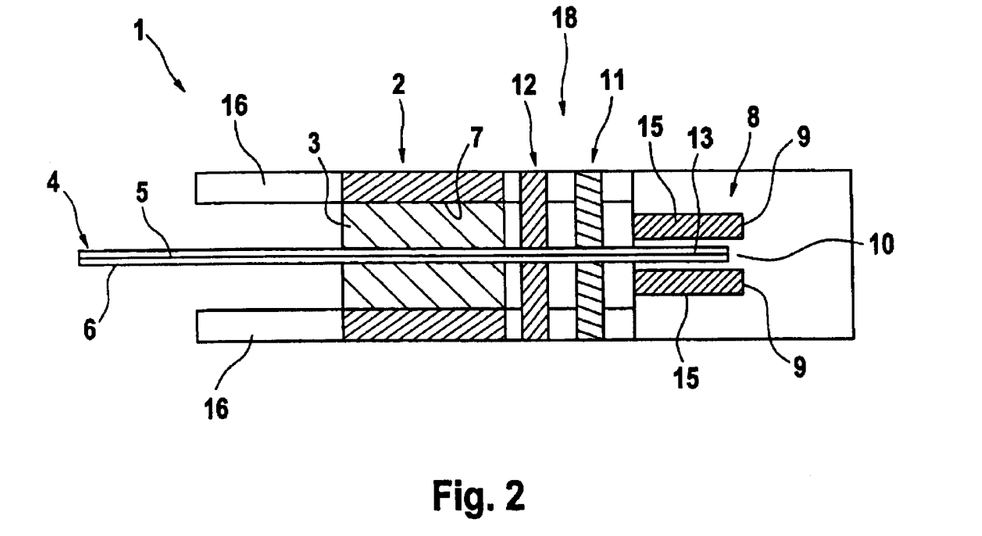

In the next step, according to FIG. 2 the holder brackets 9 are adjusted in relation to each other, wherein this adjustment moves perpendicular to the lengthwise direction of the fibre. In this way, both holder brackets 9 clamp fibre section 13 between them. Holder-bracket assembly 8 is provided with heating elements 15, which are integrated here in holder brackets 9. This means that at least one of the holder brackets 9 can be heated. The purpose of heating elements 15 is to heat insulation 6 in the cable section clamped between holder brackets 9 and thereby reduce the stability of insulation 6, which is regularly manufactured from a polymer. As soon as the heating procedure is complete, cutting device 11 is operated, which cuts into insulation 6 at the boundary between insulated fibre 4 and the fibre section to be stripped. The cutting procedure can also be carried out before or during the heating procedure accordingly.

Figure 3:
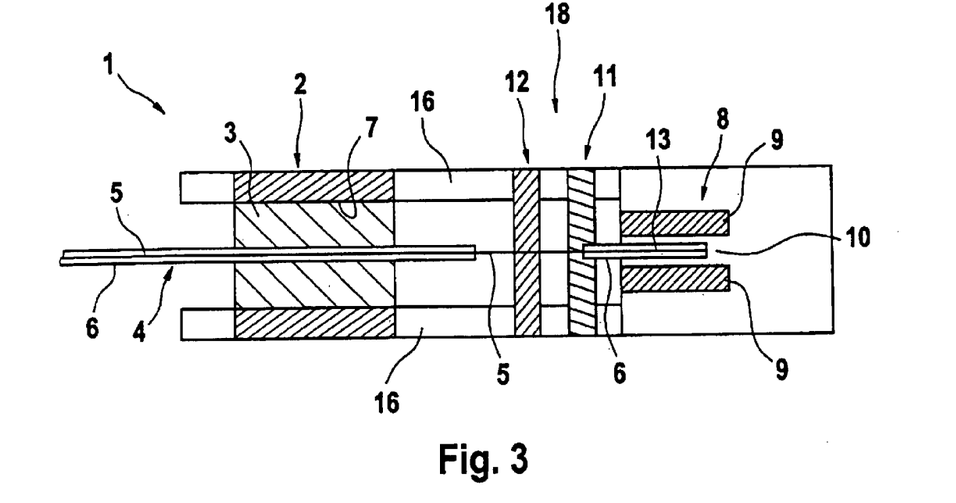

According to FIG. 3 retention device 2 and holder-bracket assembly 8 can be adjusted in relation to each other and parallel to fibre 5. The figures represent this adjustment option symbolically by means of a pair of rails 16. According to FIG. 3 retention device 2 moves away from holder-bracket assembly 8, by which fibre 5 is drawn out of the cut-off insulation 6. As soon as stripped fibre 5 is drawn sufficiently far out of cut-off insulation 6, cleaving tool 12 is operated to cleave fibre 5 perpendicular to the lengthwise direction of the fibre.

Accordingly, holder brackets 9 and therefore holder-bracket assembly 8 have a dual function, as holder brackets 9 clamp the section of insulation to be removed during stripping and exert a corresponding tensile stress on stripped fibre 5 during the cleaving procedure. Furthermore, it is preferable to provide holder brackets 9 with a heating facility so that these have an additional function.

Figure 4:
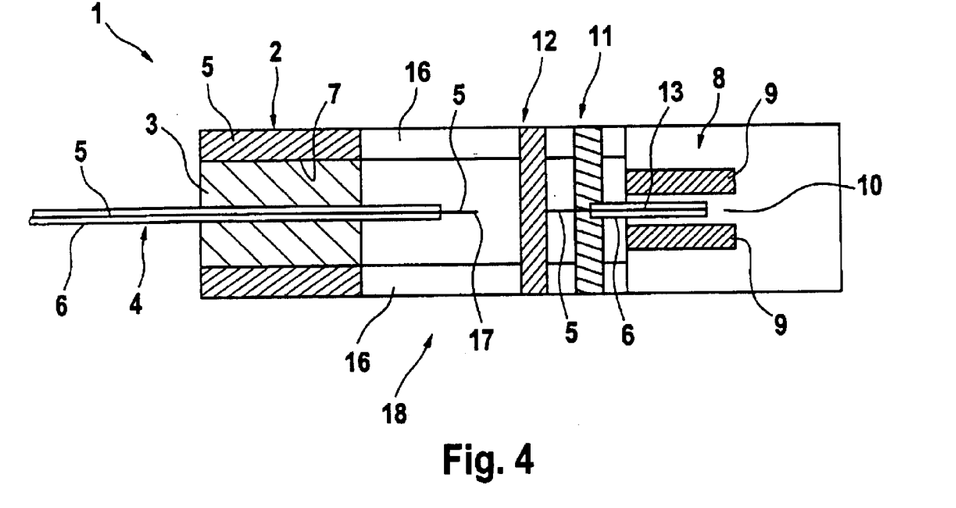

According to FIG. 4 the cleaving procedure at an end 17 of stripped fibre 5 produces an even cleaved surface, which is particularly suited to creating an optical coupling. The cleaving procedure is rendered possible because when cleaving unit 12 is operated, stripped fibre 5 is still tensioned between retention device 2 and holder-bracket assembly 8. In order to exert a tensile stress on fibre 5 that is suitable for cleaving it, it may be practical for holder brackets 9 to be controlled according to a preferred embodiment, in which a retention force used by holder brackets 9 to clamp fibre insulation 6 is increased to tension the fibre, in order to increase the removal resistance of fibre 5 from its insulation 6.

The cleaving process can in principle be carried out intermittently, i.e. retention device 2 and holder-bracket assembly 8 are fixed in relation to each other at the moment of cleaving, and the adjusting motion of retention device 2, by which this moves away from the holder-bracket assembly 8, is therefore interrupted for the cleaving process. It is similarly possible to continuously integrate the cleaving procedure in the adjusting motion of retention device 2 so that the adjusting motion of retention device 2 moves without interruption from the starting position according to FIG. 2 via the cleaving position according to FIG. 3 to the end position according to FIG. 4. However, at any rate the two holder brackets (9) exert a continuously firm hold on the section of the fibre insulation to be removed, from the starting position to the holding position, thus at least ensuring that an appropriate tensile stress can be retained in the fibre (5) when extracting the fibre its insulation to cleave it.

The cleaving procedure is preferably controlled so that a predetermined axial length of the stripped fibre section projects over insulation 6 at the side of retention device 2. Moreover, apparatus 1 can be configured in such a way that retention device 2 and holder-bracket assembly 8 can be rotationally adjusted in relation to each other and concentrically to fibre 5. When a torsion moment is exerted on axially tensioned fibre 5 during the cleaving process, the even surface at end 17 of fibre 5 can be provided with an advantageous angle in relation to a surface positioned vertically in relation to fibre 5.

Axial length 14 with which end section 13 extends into gap 10 between holder brackets 9 (cf. FIG. 1), is preferably chosen to be greater as the adjustment path of retention device 2 in relation to holder-bracket assembly 8 from the starting position according to FIG. 2 to the cleaving position according to FIG. 3. The result of this measure is that another section of fibre 5 is located in the insulation section clamped between holder brackets 9. This safeguards the facility of exerting an adequate tensile force in fibre 5 via holder brackets 9.

Moreover, the adjustment path of retention device 2 until the cleaving procedure and the position of cutting device 11 are oriented to each other in such a way that after fibre 5 has been cleaved, part of fibre 5 is still present in the insulation section clamped between holder brackets 9. This means that fibre 5 is easy to remove, in particular by hand.

Figure 5:
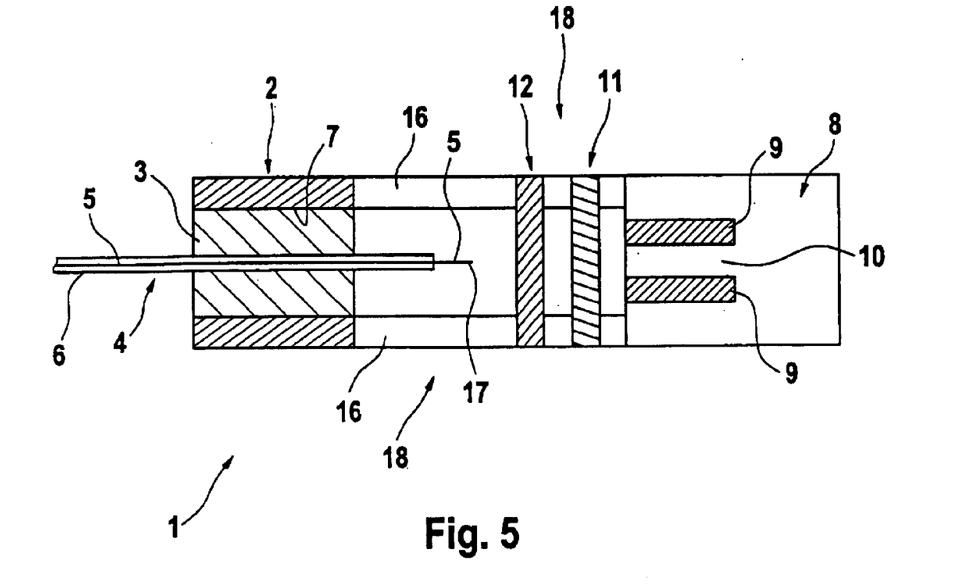
Figure 6:
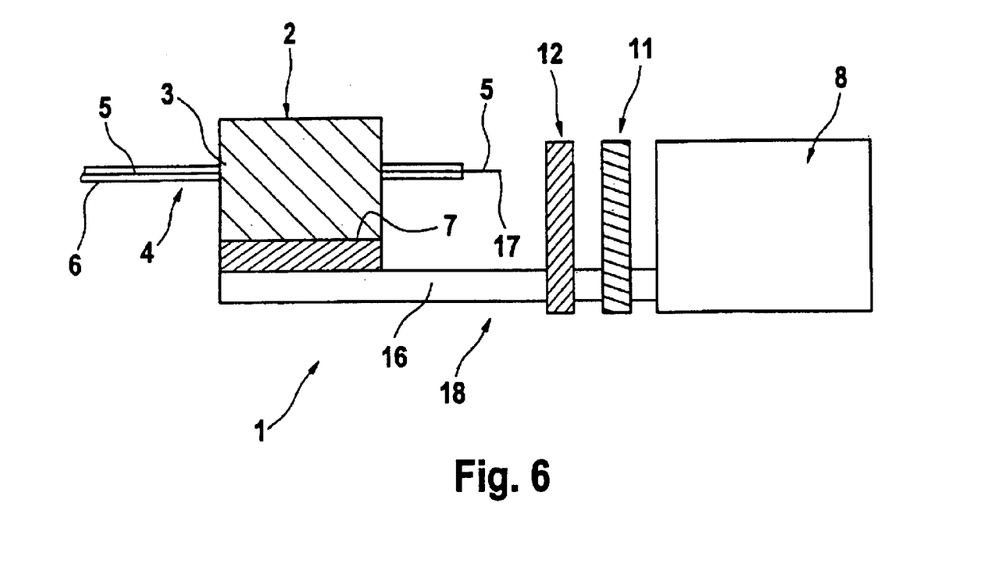

FIGS. 5 and 6 illustrate apparatus 1 according to the invention with open holder brackets 9, wherein the cleaved fibre section and the removed insulation have already been removed from gap 10 of holder brackets 9.

Provided that holder 3 is configured as an adapter, it may be practical to carry out the insulation and cleaving processes in such a way that after removing the adapter (holder 3) from seating 7, the stripped and cleaved fibre 5 is positioned in or on the adapter in such a way that the fibre—without further manipulation—can be optically connected using adapter 3 to the appropriate optical device, e.g. a measurement and/or testing device and/or a positioning device.

The embodiment of apparatus 1 according to the invention illustrated in FIGS. 1 through 6 forms a unit 18, which makes it possible to strip and cleave an optical fibre 4 or 5 in an automatic procedure. Although only one individual fibre 4 is processed in the sample execution, apparatus 1 can also be configured in such a way to simultaneously process several fibres 4, which are integrated in a fibre bundle, i.e. apparatus 1 can then strip and cleave all fibres 4 of such a fibre bundle simultaneously.

FIGS. 7 through 15 represent various embodiments of apparatus 1 according to the invention, which have been provided with an additional splicing tool 19. In the figures, splicing tool 19 is represented only by a frame outlined by dotted lines. Splicing tool 19 can be used to connect together two stripped and cleaved fibre ends with a high optical quality. Various techniques are available here for the splicing and connection process. For example, the fibre ends can be placed in an accurately prepared, linear adjustment groove to allow the fibre ends to come into contact with each other face-on. However, an embodiment is preferred in which the fibre ends are fused together. In that case, splicing tool 19 is actually a fusion-splicing tool.

The common feature of all embodiments of FIGS. 7 through 15 is that apparatus 1, which is provided with splicing tool 19 has two retention devices 2 for splicing together two stripped, cleaved fibre ends 17. This means that retention device 2 has a dual function. On the one hand, during the stripping procedure, retention device 2 serves to draw out fibre 5 from the cut-off insulation 6 and to tension stripped fibre 5 for the cleaving procedure. On the other hand, retention device 2 serves to position the allocated, stripped and cleaved fibre ends 17 in splicing tool 19.

At least for the case in which splicing tool 19 is a fusion splicer, both retention devices 2 can be adjusted three-dimensionally to each other in order to optimally position both fibre ends 17 to be connected together.

Figure 7:
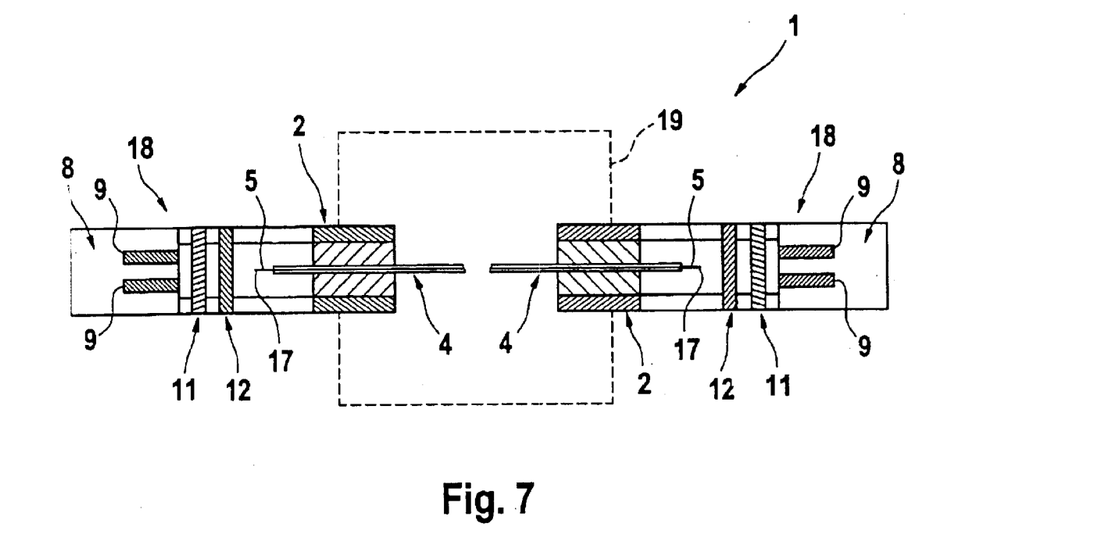
Figure 8:
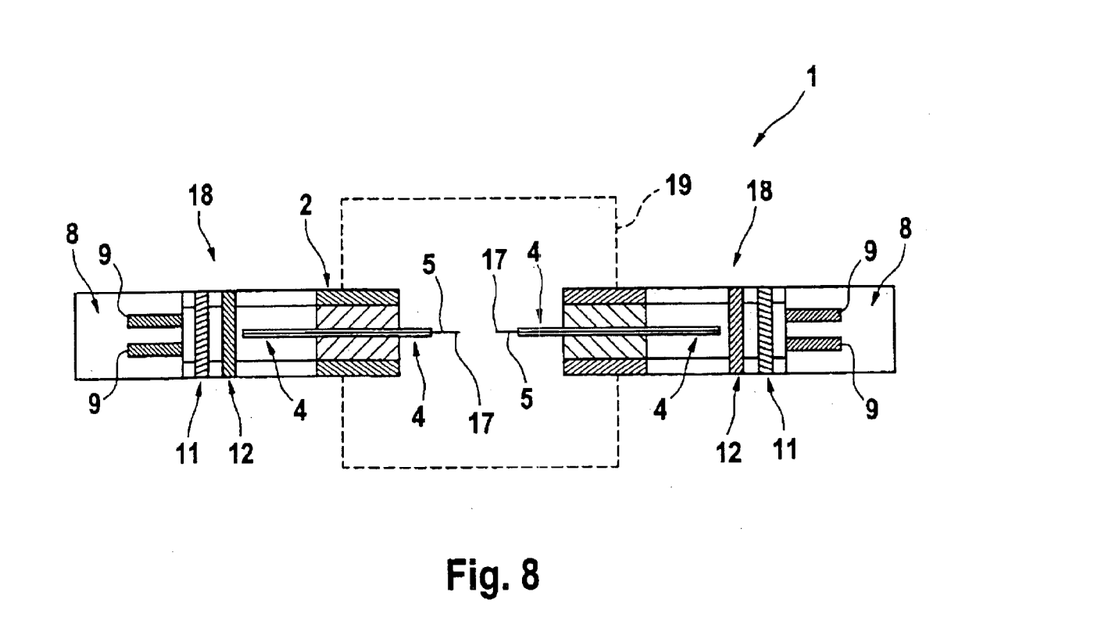

FIGS. 7 and 8 represent an embodiment, in which an entire unit 18 is provided for each insulated fibre 4. In this way, two insulated fibres 4 can be stripped and cleaved simultaneously. After the stripping and cleaving process, retention devices 2 assume the positions indicated in FIG. 7, both of which correspond to the positions indicated in FIG. 5. In order to splice both stripped and cleaved fibre ends 17 obtained in this way, both retention devices 2 are rotated 180° about a vertical axis, which is vertical to the plane of the diagram, so that both fibre ends 17 from now on are essentially axially facing each other. Corresponding adjusting motions of at least one of the retention devices 2 means that both fibre ends 17 can then be positioned in relation to each other in splicing tool 19 in such a way to carry out the splicing procedure. In this special embodiment, both units 18 are essentially aligned symmetrically with each other.

Figure 9:
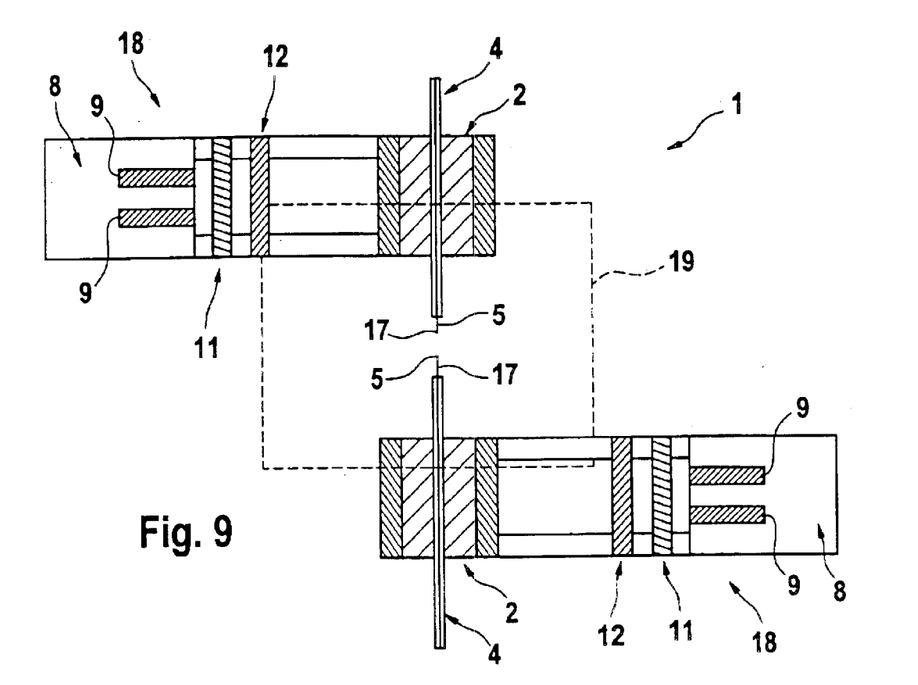

In the embodiment according to FIG. 9, both units 18 are positioned in relation to each other in such a way that both retention devices 2 only have to be rotated by 90° to be able to position fibre ends 17 in splicing tool 19 in relation to each other. It is evident that any number of other spatial arrangements are possible for both units 18.

Figure 10:
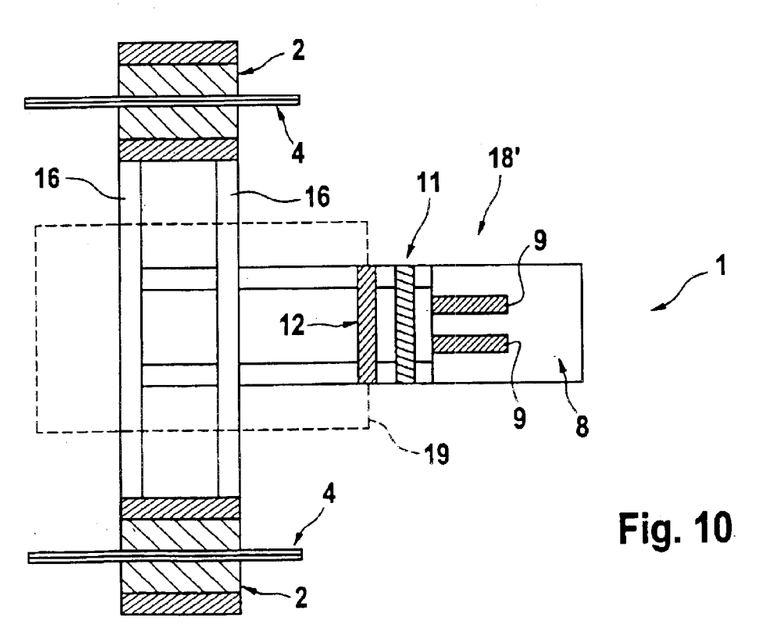
Figure 11:
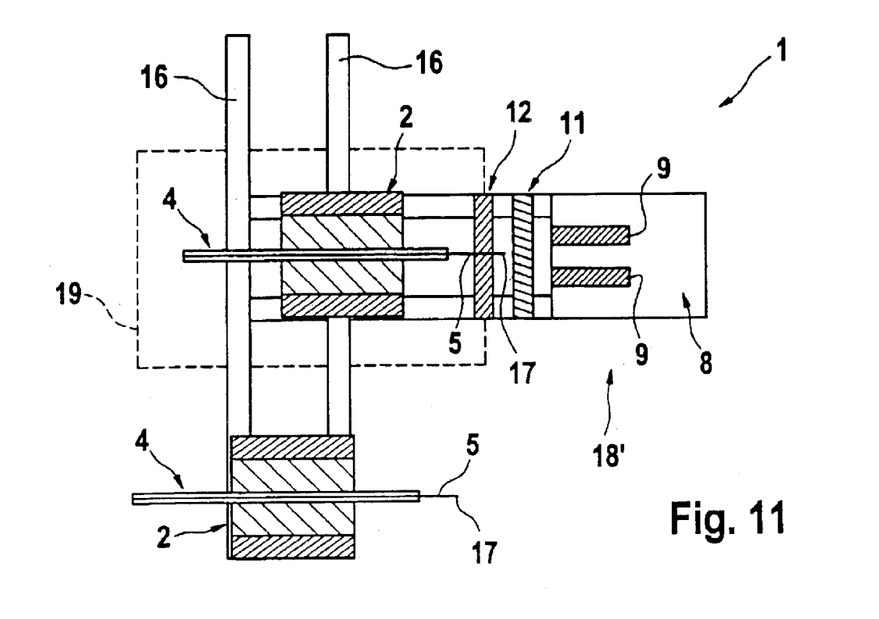
Figure 12:
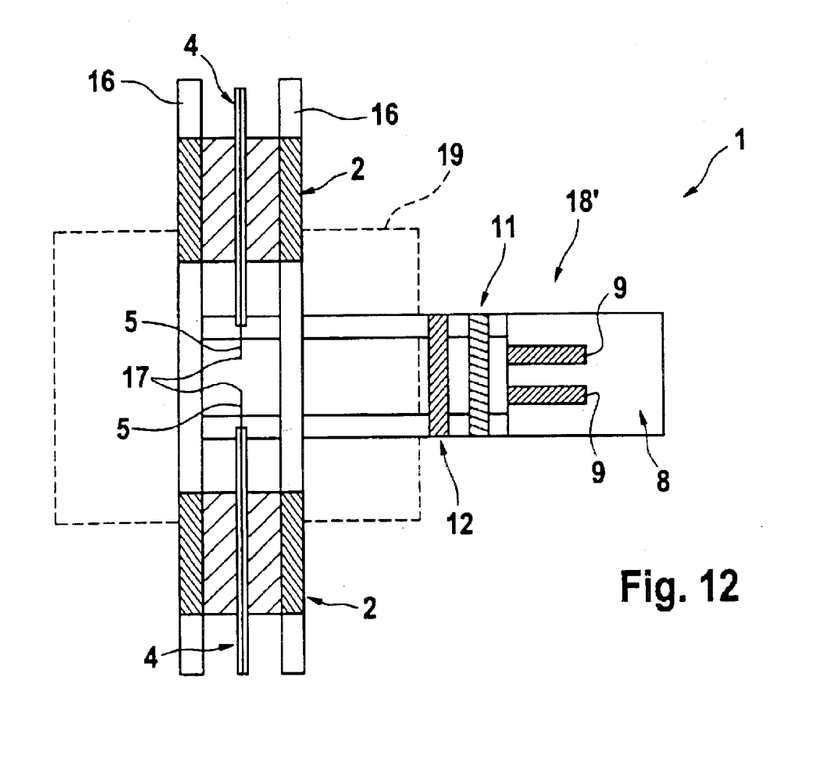

FIGS. 10 through 12 represent a further special embodiment of apparatus 1 according to the invention, in which a common unit 18' comprising holder-bracket assembly 8, cutting device 11 and cleaving unit 12 is allocated to both retention devices 2. Here, both retention devices 2 can be adjusted, for example, using corresponding rails 16, one after the other, from an initial position according to FIG. 10 to a first position, in which they collaborate separately and independently of each other with common unit 18' in order to strip and cleave the fibre ends clamped in the respective retention device 2. Correspondingly, FIG. 11 shows lower retention device 2 in the starting position, while the upper retention device occupies the aforementioned first position. When both fibre ends have been stripped and cleaved, both retention devices 2 are moved to a second position according to FIG. 12, wherein both retention devices 2 are, for example, rotated 90° about a vertical axis, which is vertical to the plane of the diagram. The stripped and cleaved fibre ends 17 are then aligned to each other in splicing tool 19 and can be positioned in relation to each other by means of adjustable retention devices 2.

Figure 13:
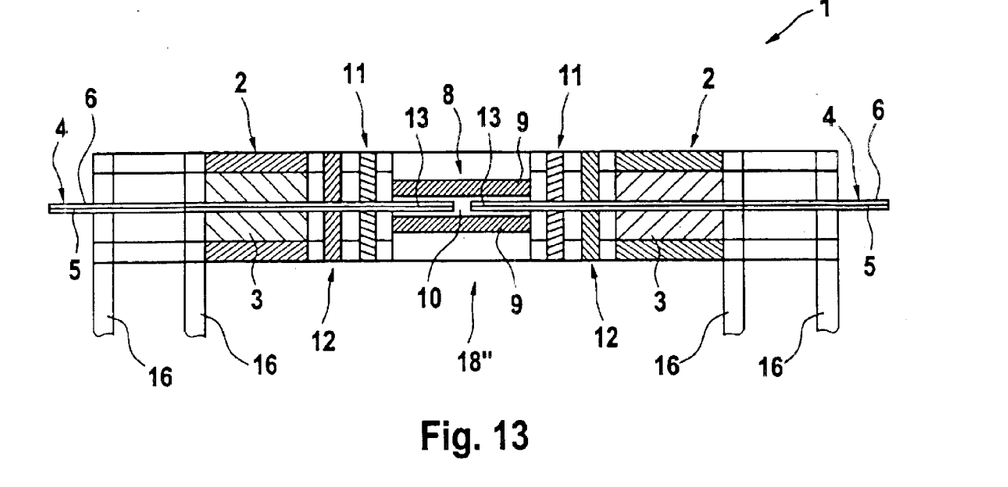
Figure 14:
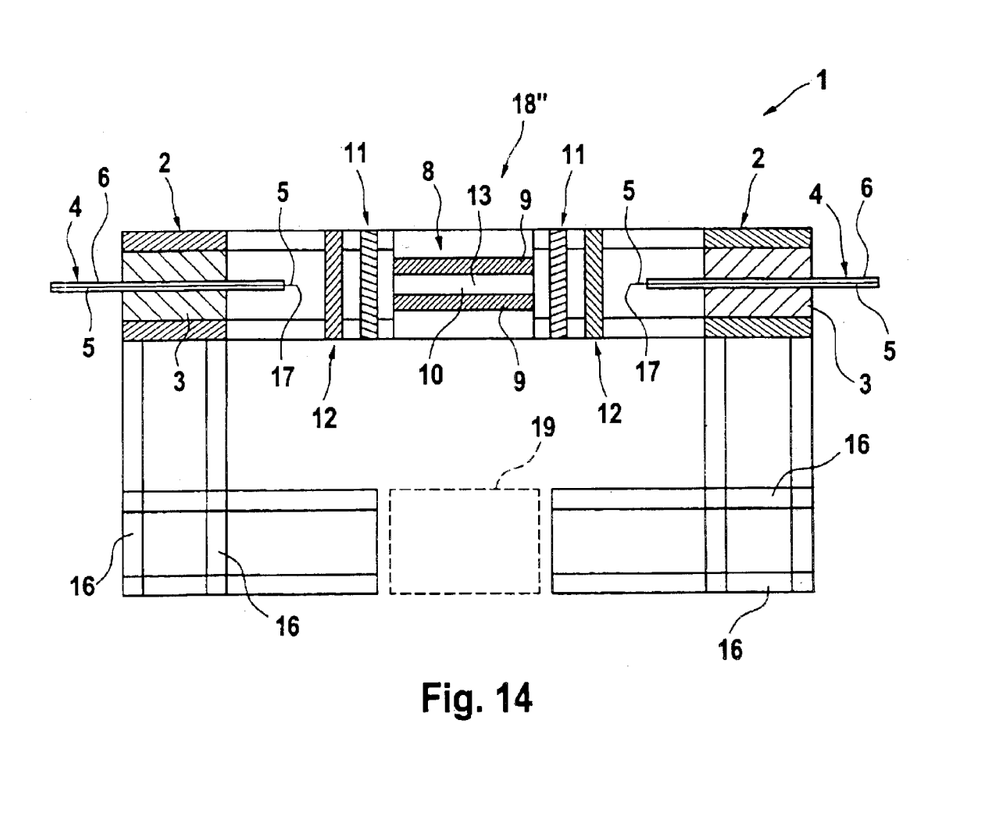
Figure 15:
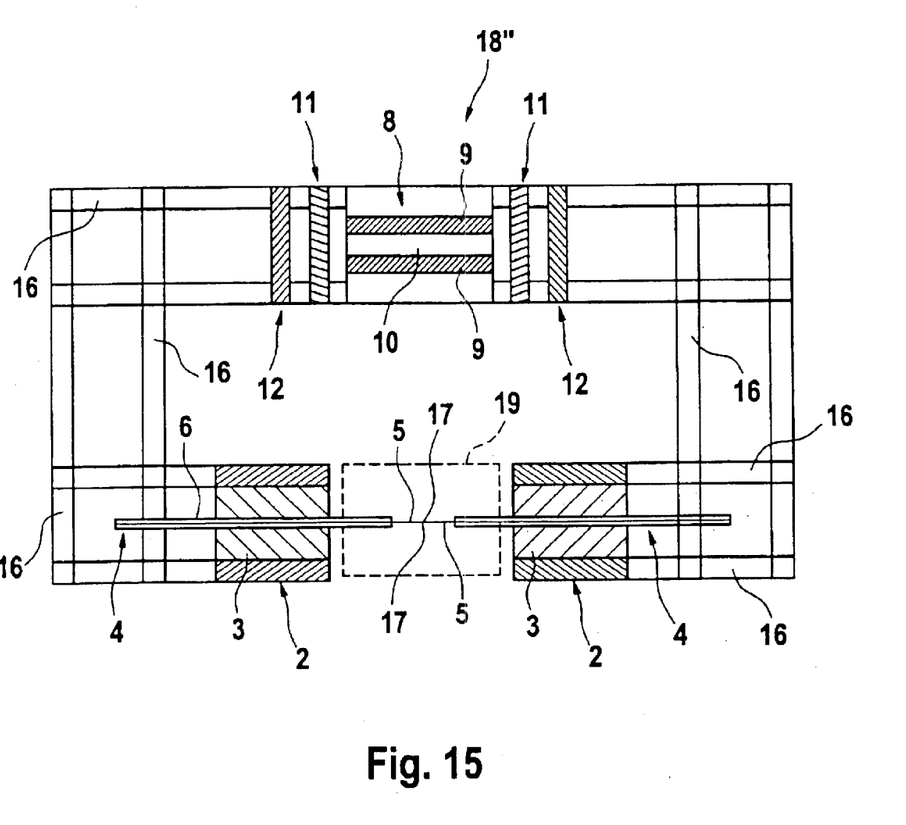

FIGS. 13 through 15 represent a further special embodiment of apparatus 1 according to the invention, wherein a common unit 18" is again allocated to both retention devices 2. In this embodiment common unit 18" has a common holder-bracket assembly 8 in a central section with holder brackets 9, the axial length of which is chosen to be approximately twice as long as the axial length of the embodiment illustrated in the other figures. Correspondingly, the fibre-end sections to be stripped are placed in one after the other in holder brackets 9. It is similarly possible to place the fibre-end sections one above the other in holder brackets 9, which can then in turn be shorter. A cutting device 11 and a cleaving tool 12 are then configured on both sides of holder-bracket assembly 8.

Both retention devices 2 can then be adjusted simultaneously from a starting position to an initial position according to FIG. 13, whereby the simultaneously collaborate with common unit 18". According to FIG. 13 the end sections 13 of insulated fibre 4 thereby extend simultaneously into the common gap 10 of common holder brackets 9. Clamping, heating and cutting into insulation 6 as well as removing and cleaving fibre 5 can then be conducted simultaneously for both insulated fibres 4. After the stripping and cleaving process, both retention devices 2 are, for example, located in the position illustrated in FIG. 14, and can be adjusted to a second position, in particular via suitable rails 16, according to FIG. 15, wherein retention devices 2 position fibre ends 17 prepared in this way in splicing tool 19 in relation to each other. The splicing procedure can then be carried out.

In the sample executions illustrated, apparatus 1, in particular its retention device 2, holder-bracket assembly 8, cutting tool 11, cleaving tool 12 and splicing tool 19, are configured in such a way that a couple of fibre ends 17 can be stripped, cleaved and connected together with the highest possible optical quality.

It is however possible in principle also to assemble such an apparatus 1 in such a way that several fibre pairs can be optically connected together. This is particularly advantageous, when several individual fibres are integrated to form a fibre bundle, so that apparatus 1 according to the invention can be used, for example, to optically connect together two such fibre bundles. This individual fibre pairs can for example, in principle, be connected in succession, if the fibre bundle in question was previously separated into individual fibres. It is likewise possible to connect together several or all fibre pairs simultaneously. In the case of separated fibre bundles apparatus 1 can have two separate retention devices 2 for each fibre pair.

What is claimed is:

1. An apparatus for processing an insulated fibre having an optical fibre that is provided with an insulation, the apparatus comprising:

a retention device, into which the insulated fibre to be processed can be placed and which clamps the insulated fibre placed inside it, a holder-bracket assembly with two holder brackets, between which a projecting section of the insulated fibre clamped in the retention device extends beyond the retention device in a starting position, wherein the brackets can be adjusted in relation to each other substantially perpendicular to the fibre, and secure a section of fibre insulation in a holding position in order for it to be removed, a cutting device, which cuts into the insulation to be removed substantially perpendicular to the fibre, wherein:

the retention device and the holder-bracket assembly can be adjusted in relation to each other and parallel to the fibre, in the case of a relative adjustment between retention device and holder-bracket assembly the fibre is fixed in relation to the retention device, while the cut-off insulation is fixed in relation to the holder-bracket assembly, a cleaving tool, cleaves the fibre, held tight between the retention device and the holder-bracket assembly, in a stripped section under tension and substantially perpendicular to the fibre, and the two holder brackets exert a continuously firm hold on the section of the fibre insulation to be removed, from the starting position to the holding position, thus least ensuring that an appropriate tensile stress can be retained in the fibre when extracting the fibre from its insulation to cleave it.

2. The apparatus of claim 1, having at least one of the following characteristics the holder brackets producing a retention force used by the holder brackets to hold the fibre insulation, are controlled so that the retention force is greater when the fibre is to be cleaved than when the insulation is removed from the fibre, the stripped fibre is cleaved during the relative adjustment between retention device and holder-bracket assembly, the retention device and the holder-bracket assembly (8) can be rotationally adjusted in relation to each other and concentric to the fibre.

3. A method for processing an insulated fibre having an optical fibre that is provided with an insulation, the method comprising:

placing an insulated fibre to be processed in a retention device and clamping the insulated fibre within this retention device so that a projecting section of insulated fibre clamped in the retention device extends beyond the retention device between two holder brackets of a holder-bracket assembly, adjusting the holder brackets in relation to each other, substantially perpendicular to the fibre from a starting position into a clamping position, in which they hold a section of the insulation that is to be removed, using a cutting device to cut into the insulation to be removed substantially perpendicular to the fibre, adjusting the retention device and the holder-bracket assembly in relation to each other and parallel to the fibre, wherein the fibre is fixed in relation to the retention device, while the cut-off insulation is fixed in relation to the holder-bracket assembly, using a cleaving tool to cleave the fibre, held tight between the retention device and the holder-bracket assembly, in a stripped section under tension substantially perpendicular to the fibre, wherein the two holder brackets exert a continuously firm hold on the section of the fibre insulation to be removed, from the starting position to the holding position, thus at least ensuring that an appropriate tensile stress can be retained in the fibre when extracting the fibre from its insulation to cleave it.

4. The method of claim 3, at least one of the following characteristics:
the holder brackets producing a retention force used by the holder brackets to hold the fibre insulation are controlled so that the retention force is greater when the fibre is to be cleaved than when the insulation is removed from the fibre;
the stripped fibre is cleaved during the relative adjustment between retention device and holder-bracket assembly;
the section of insulation to be removed is heated before adjusting the retention device and the holder-bracket assembly in relation to each other and parallel to the fibre.

5. The of apparatus claim 1, in which the retention device has a seating for mounting an adapter, into which the insulated fibre to be processed can be placed and which clamps the insulated fibre placed within it, wherein this adapter can be connected to device.

6. The apparatus of claim 5, in which the fibre, after having been cleaved and after been removed from the seating is positioned in or on the adapter, so that the adapter can be used to optically connect the fibre to the device.

7. The apparatus of claim 1, in which the holder-bracket assembly comprises heating elements to heat the insulation section clamped between the holder bracket.

8. The apparatus of claim 7, in which the heating elements of holder-bracket assembly are mounted in such a way that at least one of the holder brackets can be heated.

9. The apparatus of claim 1, in which the device is configured for the simultaneous processing of several integrated fibres forming one fibre bundle.

10. The apparatus of claim 9, in which the cutting device is configured for simultaneously cutting into the insulation of all the fibres in the fibre bundle.

11. The apparatus of claim 9, in which the cleaving tool is configured for simultaneously cleaving all the stripped fibres in the fibre bundle.

12. The apparatus of claim 1, in which at least two retention devices are provided so that at least two fibres can be stripped and cleaved, and in which a splicing tool is provided to optically connect together two stripped and cleaved fibres that are positioned against each other, in which the two retention devices can be adjusted in relation to each other so that the splicing tool uses these retention devices to position the fibres in relation to each other so that they can be optically connected together.

13. The apparatus of claim 12, comprising the splicing tool as a fusion splicer, in which the retention devices can be adjusted three-dimensionally in relation to each other.

14. The apparatus of claim 12, having at least one of the following characteristics:
both retention devices have a common unit comprising the holder-bracket assembly, cutting device and cleaving tool, both retention devices can be adjusted in succession in an initial position, in which they work together individually with the common unit to strip and cleave the relevant fibre and both retention devices can also be adjusted in a second position, in which the fibres clamped in the retention devices are connected together in the splicing tool;
both retention devices have a common unit comprising a cutting device and a cleaving tool on either side with a common holder-bracket assembly between them, both retention devices can be adjusted in an initial position, in which they work together with the common unit on opposite sides simultaneously, and both retention devices can be adjusted in a second position, in which the fibres clamped in the retention devices are connected together in the splicing tool;
each retention device has a separate unit comprising a holder-bracket as cutting device and cleaving tool, both retention devices can be adjusted in an initial position, in which they work together with the corresponding separate unit, and both retention devices can be adjusted in a second position, in which the fibres in the retention devices are connected together in the splicing tool;
each retention device has a separate unit comprising a holder-bracket assembly, cutting device and cleaving tool, both retention devices can be adjusted in an initial position, in which they work together with the corresponding separate unit, and both retention devices can be adjusted in a second position, in which the fibres clamped in the retention devices are connected together in the splicing tool and the retention devices can be rotationally adjusted between their initial position and their second position.

15. The apparatus of claim 12, having at least one of the following characteristics:
the splicing tool is configured to connect several fibres on a pair-by-pair basis;
the splicing tool is configured to connect several fibres on a pair-by-pair basis and the fibres to be connected together on a pair-by-pair basis are integrated to form fibre bundles;
the splicing tool has two retention devices for each fibre pair to be connected together;
the splicing tool has two retention devices for each fibre pair to be connected with each other and the fibres of the fibre pair are connected together in succession or simultaneously.

16. The apparatus of claim 5, wherein the device comprises one of an optical device or a device that can at least be connected to another device for measuring, testing or positioning.

* * * * *

UNITED STATES PATENT AND TRADEMARK OFFICE
CERTIFICATE OF CORRECTION

PATENT NO. : 6,850,686 B2  
DATED : February 1, 2005  
INVENTOR(S) : Mueller et al.

Page 1 of 1

It is certified that error appears in the above-identified patent and that said Letters Patent is hereby corrected as shown below:

Column 8,  
Line 26, between "thus" and "least" please insert -- at --

Column 9,  
Line 7, between "3," and "at" please insert -- having --  
Line 24, between "to" and "device" please insert -- a --  
Line 31, please replace "bracket" with -- brackets --

Column 10,  
Line 20, please replace "as" with -- assembly --  
Line 24, between "fibres" and "in" please insert -- clamped --

Signed and Sealed this

Ninth Day of August, 2005

JON W. DUDAS  
*Director of the United States Patent and Trademark Office*